INVENTOR.
RICHARD G. CLAPP
BY
[signature]
ATTORNEY

United States Patent Office 2,851,521

Patented Sept. 9, 1958

2,851,521

ELECTRICAL SYSTEM FOR KEEPING A SCANNING LIGHT BEAM CENTERED ON A LINE

Richard G. Clapp, Narberth, Pa., assignor to Philco Corporation, Philadelphia, Pa., a corporation of Pennsylvania Application January 11, 1954, Serial No. 403,311

5 Claims. (Cl. 178—7.2)

Figure 1:
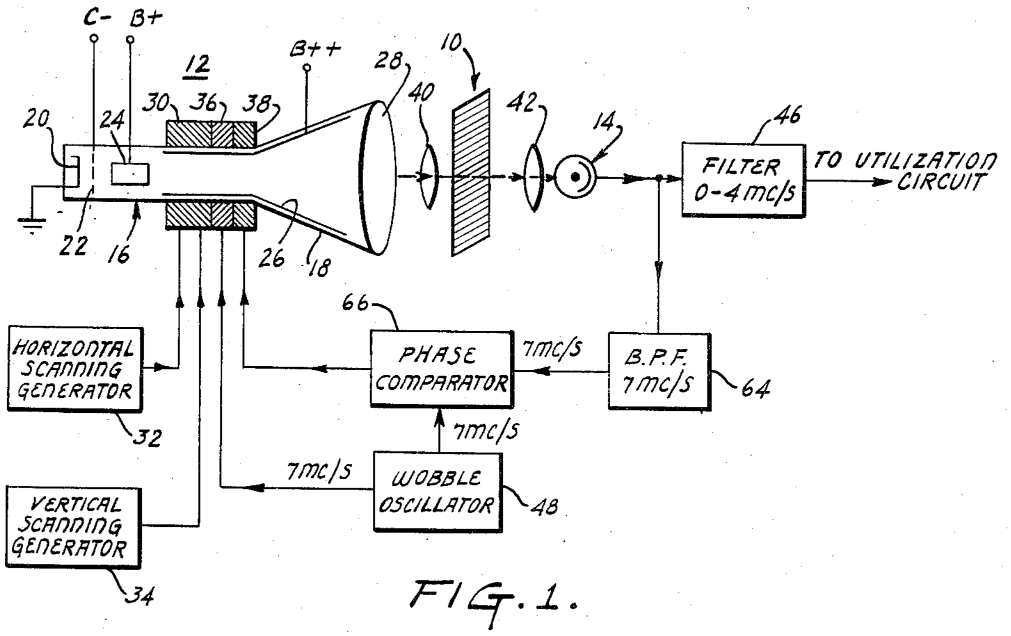

The present invention relates to electrical systems and more particularly to systems for producing a television signal from a so-called "video recording."

In many instances it is desired to broadcast a television program at a time subsequent to its initial presentation. In order to do this, it has been the practice to make a photographic record of the picture portion of the television-program material from the face of a cathode ray tube, and to use this recording as the picture image source for the subsequent broadcast by supplying the same to an appropriate camera system which is adapted to produce a video signal indicative of the program material. The camera system used may be of the type well known as a flying spot scanner or may be of the type known as an image storage camera. Whichever type of camera system is used, it is fundamental to the operation of the camera that the recorded image must be scanned in consecutive segments, e. g., line by line, by means of an analyzing spot which, in the case of a flying spot scanner, is a light spot generated by a cathode ray tube, or, in the case of an image storage camera, is the spot produced by an electron beam which is scanned over a photosensitive target system onto which the recorded image is projected.

As is well known, during each frame period the original program material is broken down into a plurality of discrete horizontal line elements by the scanning operation to produce a video wave. When the picture is reproduced by a cathode ray tube a similar scanning operation serves to reassemble the line elements in their original position. It will be appreciated that the width of the reproduced line elements will be determined by the size of the light spot produced by the cathode ray beam. The size of the light spot must necessarily be kept small in order to achieve the desired degree of horizontal resolution in the reproduced image. As a result, the picture line elements reproduced by the cathode ray tube will be spaced apart and the resulting picture will exhibit a line structure. When the picture is photographed to produce a video recording, this line structure will also appear on the photographic record.

An important problem which exists in reproducing video recordings, is that the exploring spot of the camera system does not necessarily follow exactly the picture line elements of the recorded image. This is due to the fact that the vertical scanning rate of the cathode ray tube serving to produce the recording cannot feasibly be made identical to the vertical scanning rate of the reproducing camera system, and to the fact that the recording may not be accurately positioned in the optical path of the camera. As a result, the scanning spot may stray from the axes of the picture line elements and actually scan the spaces between the line elements. This misalignment of the scanning spot brings about a loss of vertical definition in the image reproduced at the home receiver and may even produce a beat pattern in the reproduced image.

It has been proposed to reduce the line structure of the video recording by appropriately increasing the vertical size of the beam spot of the cathode ray tube from which the video recording is made so that adjacent picture line elements are substantially in contact. While this expedient substantially reduces the possibility of producing beat patterns in the image reproduced at the home receiver, it does not lessen the loss of the vertical definition of the image such as occurs when the exploring spot of the reproducing camera overlaps two lines of the recorded image.

Accordingly it is an object of the invention to provide improved systems for reproducing video recordings.

A further object of the invention is to provide improved systems for reproducing a video recording having a line structure in a manner which avoids beat patterns in the image reproduced at a home receiver.

Another object of the invention is to provide improved systems of the foregoing type characterized in that the generated video signal contains substantially all of the resolvable image information contained in the video recording to be reproduced.

Further objects of the invention will appear as the specification progresses.

In accordance with the invention, in a television system adapted to produce a video signal by the scanning action of an image exploring spot over an image made up of consecutive picture line elements, the foregoing objects are achieved by utilizing the line structure of the image to control the position of the exploring spot of the camera system so that the spot is confined to a path along the image lines to be scanned. More particularly, and in a preferred embodiment of the invention, the foregoing objects are achieved by utilizing the line structure of a video recording to produce a control signal which serves to restrict the exploring spot of the reproducing camera to paths coincident with the consecutive picture line elements of the recording. To generate the said control signal, means are provided for imparting to the exploring spot an auxiliary deflection in a direction transverse to its scanning direction along the picture line element of an amplitude sufficient to cause the spot to make periodic excursions into the spaces bounding the line element, and for deriving from the camera system an output signal having a phase and magnitude as determined by the direction and extent of the average departure of the exploring spot from the desired path.

Figure 2:
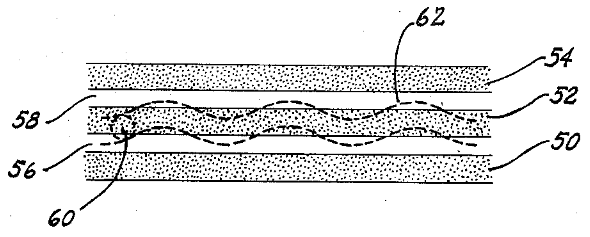

The invention will be described in greater detail with reference to the appended drawings forming part of the specification and in which:

Figure 1 is a block diagram, partly schematic, showing one form of video recording reproducing system in accordance with the invention; and Figure 2 is a diagrammatic representation showing one form of the scanning action which takes place in the systems in accordance with the invention.

Referring to Figure 1, the video recording to be reproduced is shown diagrammatically at 10. In order to simplify the drawing and description, only a single frame of the video recording has been illustrated. However, it will be understood that, in general, the video recording is in the form of a continuous film having successive frames of the television-program material. Furthermore, although not shown, it will be understood that a suitable mechanism is provided for intermittently advancing successive frames of the television-program film into the scanning position. Such a mechanism may be of conventional form well known in the art and, since it forms no part of the present invention, no further description thereof herein is believed to be necessary.

For analyzing the video recording, thereby to produce a video signal indicative of the television-program material, there is provided a flying spot scanner 12 and a photo-electric pickup system 14. Scanner 12 is conventional in form, except to the extent hereinafter to be pointed out, and comprises a cathode ray tube 16 containing, within an evacuated envelope 18, an electron beam generating and intensity control system comprising a cathode 20, a control electrode 22, a focusing electrode 24 and an accelerating electrode 26. The electrode 26 may consist of an electrically conductive coating on the inner wall of the envelope. Electrode 22 is maintained at a desired operating bias voltage by means of a negative potential source shown as C— which is connected to the electrode. Suitable voltage sources shown as B+ and B++ serve to energize the focusing electrode 24 and the accelerating electrode 26. The end face 28 of the tube 16 is provided with a coating (not shown) of a fluorescent material serving to produce a light spot when energized by the impinging electron beam. As a rule the fluorescent coating consists of a material having a short persistence and may consist typically of zinc oxide.

A deflection yoke 30, which is coupled to horizontal and vertical scanning generators 32 and 34 respectively, is provided for scanning the electron beam over the fluorescent coating of the face plate 28. The generators 32 and 34 are conventional in form and may consist of sawtooth current generators operating at line and field scanning frequencies as determined by the standards of the television system. For example, generator 32 may operate at a frequency of 15,750 c./sec. and generator 34 may operate at 60 c./sec. in accordance with present day standards.

The cathode ray tube 16 is additionally provided with two auxiliary yokes 36 and 38 adapted to deflect the beam in a vertical direction for purposes later to be discussed in detail.

The flying light spot produced by scanning the coated face plate 28 serves as an exploring spot for video recording 10 which, in turn, modulates the intensity of the light spot as determined by the light transmission and/or reflection of the various picture elements thereof. By means of the photo-electric pickup 14 the so modulated light is converted into a video signal having amplitude variations indicative of the picture intelligence contained in the recording 10. The signal generated by the pickup 14 is supplied to the utilization circuit thereof through a low pass filter 46. Filter 46 may be conventional in form and may consist of a pi-network having a cut-off frequency of 4 mc./sec. as shown.

A projection-lens system, shown diagrammatically as a single lens element 40, is interposed between the face plate 28 and the recording 10 and serves to focus the light spot generated by the tube 16 onto the surface of the recording 10. A collecting-lens system, shown diagrammatically as a lens element 42, serves to collect the modulated light from the image recording and to direct the same to the photo-electric pickup 14.

In order to avoid a loss of the picture information contained in the video recording, it is necessary that the path of the exploring light spot produced by the cathode ray tube 16 coincide with the axes of the picture line elements of the recording 10. This coincidence between the scansions of the light spot and the picture line elements obtains only when the displacement of the consecutive line scansions of the exploring spot exactly corresponds to the displacement of the consecutive picture line elements of the recording and when the recording is properly positioned in the optical system of the camera. When these conditions are not fulfilled, a greater or a lesser amount of the picture information is lost depending on the extent of the misalignment between the path of the exploring light spot and the picture line elements of the recording 10. In the most severe case, in which the exploring spot scans between two adjacent picture lines and the size of the spot is less than the spacing between the picture line elements, no video information will be derived from the recording. When the size of the exploring spot is greater than the spacing between adjacent image lines of the recording and scans a path midway between the lines, the vertical resolution of the camera system is seriously impaired, and in addition the intensity of the video signal produced is reduced.

In order to control the vertical position of the exploring light spot so that its path is always centered about the picture line elements of the video recording 10 being scanned, the system of Figure 1 provides means for imparting an auxiliary vertical deflection to the cathode ray beam thereby to cause the exploring light spot produced thereby to make a plurality of excursions into the spaces bounding the picture line element during each line scansion period. This auxiliary vertical deflection of the cathode ray beam, and hence of the exploring light spot, may take any of several forms. For example, the auxiliary vertical deflection may have a sawtooth waveform or may have a stepped rectangular pulse form. In the form most simply realized, the auxiliary vertical deflection is sinusoidal as shown in Figure 2.

Figure 2 diagrammatically illustrates a small portion of the video recording 10 and the path of an exploring light spot which is sinusoidally deflected as it scans along one of the line elements of the recording. Portions of three of the picture line elements have been shown as 50, 52 and 54, the spaces between the line elements are shown at 56 and 58, and the exploring light spot is shown at 60. The sinusoidal path of the spot as it scans the picture line element 52 has been indicated by the numeral 62.

The above noted auxiliary deflection of the exploring light spot is produced by vertically deflecting the cathode ray beam by energizing the auxiliary deflection yoke 36 by means of a wobble oscillator 48. The oscillator 48 may be conventional in form and may consist of an electron discharge device having its input and output electrodes coupled together in regenerative feedback relationship by means of a resonant circuit. The operating frequency of the oscillator should be high compared to the horizontal scanning frequency so that a plurality of excursions of the light spot occur during each horizontal scansion period and desirably the frequency thereof is greater than the maximum frequency of the video signal to be generated. In a typical case oscillator 48 operates at a frequency of the order of 7 mc./sec. The amplitude of the signal supplied by the oscillator 48 to the auxiliary deflection yoke 36 may be adjusted in well known manner to limit the excursions of the beam produced thereby so that, when the exploring light spot is centered on a given line picture element, it does not impinge on the adjacent picture line elements of the video recording.

The auxiliary vertical deflection of the exploring spot 60 (see Figure 2) causes the spot to impinge the spaces 56 and 58 twice during each cycle of the auxiliary vertical deflection so that a series of light pulses is produced. When the path of the light spot 60 is directly centered about the axis of the line element 52 these light pulses are spaced at equal time intervals and produce a 14 mc./sec. signal in the photo-electric pickup 14. However, if the center of movement of the light spot departs from the axis of the line element 52, adjacent pairs of the light pulses will be brought closer together or spaced farther apart so that a 7 mc./sec. signal will be generated by the pickup 14. This 7 mc./sec. signal exhibits a phase polarity and an amplitude as determined by the direction and extent of the departure of the light spot from the axis of the picture line element 52.

The 7 mc./sec. signal so produced may be selectively derived from the output of the pickup 14 by means of a bandpass filter 64 (see Figure 1). Filter 64 may be conventional in form and may consist of an inductance-capacitance circuit broadly resonant at 7 mc./sec.

The signal derived from the filter 64 is supplied to a phase comparator 66 to which is also supplied a signal at 7 mc./sec. from the oscillator 48. Phase comparator 66 may be conventional in form and may consist for example of a bridge, two arms of which are made up of diode elements which are energized in phase opposition by one of the input signals and in the same phase sense by the other of the input signals. In one form, the phase comparator may be of the type described by R. H. Dishington in the publication "Proceedings of the I. R. E.," December 1949, at page 1401 et seq. The output signal of the phase comparator 66 exhibits a polarity and amplitude as determined by the phase and amplitude of the signal derived from the bandpass filter 64 and may be used for maintaining the exploring spot centered on the picture lines of the recording 10 by supplying the same to the auxiliary vertical deflection yoke 38. Alternatively, and as will be readily apparent to those skilled in the art, the output signal of the phase comparator 66 may be supplied to the vertical deflection winding of the yoke 30, thereby to vary the amplitude of the vertical deflection field in well known manner and maintain the desired registration between the light spot and the picture line elements of the recording 10. When this latter arrangement is used, the auxiliary yoke 38 becomes unnecessary.

While the invention has been described with specific reference to the use of a flying spot scanner system, it will be apparent that the invention is also applicable to other forms of camera systems for reproducing video recordings. For example, the invention is also applicable to reproducing camera systems utilizing a storage type camera tube in which the recording is projected onto a photo-sensitive cathode, thereby to form an electron image which similarly exhibits a line structure and which is subsequently scanned by an electron beam contained within the camera tube. By additionally deflecting the beam in the manner previously described, the beam is made to produce a control signal in the signal pickup system of the camera tube. This control signal may be separated from the desired video signal by an appropriate filter system and used, as above described, to maintain the beam centered about the spaced picture line elements of the image formed by projecting the recording onto the photosensitive cathode.

While I have described my invention in a specific embodiment and by means of specific examples I do not wish to be limited thereto for obvious modifications will occur to those skilled in the art without departing from the spirit and scope of the invention.

What I claim is:

1. Apparatus for scanning a recording in which intelligence is stored substantially permanently in a given pattern of lines separated from one another by spaces devoid of said intelligence, said lines having variations in their light absorption characteristics said apparatus comprising: means for producing an exploring light beam, means for deflecting said beam to scan said recording in a pattern generally corresponding to said given pattern, said deflecting means also causing said beam to impinge periodically on said spaces, means responsive to the scanning of said beam along substantially the entire length of selected ones of said lines of said recording for simultaneously producing signals corresponding to said stored intelligence and to the impingement of said beam on said spaces, and means coupled to said beam deflecting means and to said last-named signal producing means for substantially coordinating the scanning pattern of said beam with said given pattern, said coordinating means including means responsive to variations in the frequency, phase and amplitude of the signals produced by said beam as it impinges upon the spaces between said lines.

2. Apparatus for scanning a film recording of a televised scene in which intelligence is stored substantially permanently in a given pattern of spaced lines having density variations therein, said apparatus comprising: means for producing an exploring light beam, means for wobbling said beam at a given frequency so that it periodically impinges on the spaces between said recorded lines, means for deflecting said wobbled beam to scan along substantially the entire length of each line of said recording thereby to produce a pattern generally corresponding to said given pattern, means responsive to the impingement of said wobbled beam on the lines of said recording and on said spaces for producing simultaneously in response to the scanning of each line of said recording, signals having components related respectively to said stored intelligence and to said given frequency, a beam control circuit responsive to the frequency, amplitude and phase variations of said component related to said given frequency, means for continuously applying only said component related to said stored intelligence to a utilization circuit, and means coupled to said signal producing means and to said deflecting means which is responsive substantially only to the component related to said given frequency for continuously supplying said latter component to said beam control circuit.

3. Apparatus for producing a video signal representative of video intelligence recorded substantially permanently in a video recording in the form of variations in the density of a medium from point to point along a plurality of substantially parallel lines spaced apart in a given rectilinear pattern, comprising a cathode ray tube with means including deflecting means associated therewith for producing an exploring beam of constant intensity light which traces a rectilinear scanning pattern of spaced substantially parallel lines corresponding generally to that of said recording, means for applying an auxiliary deflection signal to said deflecting means for imparting an auxiliary movement to said beam in a direction transverse to the direction of movement of said beam along said parallel scanning lines which causes periodic excursions of said beam into the spaces adjacent to said parallel lines, means responsive to the scanning of said beam along substantially the entire length of each of said recorded lines for producing simultaneously a composite electrical signal having a video signal component which corresponds to said variation in said density of said recording and also having an output signal component which corresponds to said excursions, and means responsive to said output signal component for controlling the deflection of said beam whereby the latter tends to scan separately each individual line of said recording in sequence.

4. Apparatus for producing a video signal representative of video intelligence recorded substantially permanently in a video recording in the form of variations in the density of a medium from point to point along a plurality of substantially parallel lines spaced apart in a given rectilinear pattern, comprising means including a cathode ray tube for producing an exploring light beam of constant intensity and for rectilinearly deflecting said beam thereby to produce a rectilinear scanning pattern of said beam over said recording consisting of spaced substantially parallel lines corresponding generally to said given rectilinear pattern, means for applying an auxiliary deflection signal having a given frequency to said cathode ray tube system whereupon said exploring beam is further caused to scan said recording in a direction transverse to the direction of movement of said beam along said parallel recorded lines, said beam thereupon making periodic excursions into the spaces adjacent to said parallel lines, means responsive to the scanning of said beam along substantially the entire length of each of said recorded lines for producing simultaneously both a video signal corresponding to said variations in said density and an output signal corresponding to the impingement of said beam on said spaces, means coupled to said signal producing means for selectively transmitting substantially said video signal continuously to a utilization circuit, means coupled to said last-named signal producing means for selectively deriving said output signal at said given frequency, and means responsive to said selectively derived output signal for adjusting the deflection of said beam so as substantially to maintain the excursions of said beam centered on said recorded lines.

5. Apparatus for producing a video signal representative of video intelligence recorded substantially permanently in a video recording in the form of a photographic image transparency having density variations from point to point along each of a plurality of substantially parallel lines spaced apart in a given rectilinear pattern, comprising a cathode ray tube having means for producing an electron beam, a beam responsive light producing screen arranged in the path of said beam and adapted to produce a fixed intensity light beam in response to the impingement of said electron beam on said screen, said recording being positioned in the optical path of said light beam to modify the intensity of said light beam, means for rectilinearly deflecting said electron beam thereby to rectilinearly deflect said light beam and produce on said recording a light scanning pattern of spaced substantially parallel lines corresponding generally to to said given rectilinear pattern, means for sinusoidally deflecting said electron beam at a predetermined frequency so as to produce sinusoidal deflections of said light beam from a predetermined median line parallel to said recorded lines in a direction transverse to the movement of said light beam along each of said parallel recorded lines thereby producing periodic excursions of said light beam into the spaces adjacent to said parallel lines, a photo-electric device located in position to receive light derived from said light beam as modified by said recording, said device being adapted to produce simultaneously a signal comprising a first signal component having intensity variations determined by the scanning by said beam of the density variations along substantially the entire length of each of said recorded lines and a second signal component having intensity variations recurring in synchronism with the excursions of said light beam into the spaces adjacent to said parallel lines said second signal component having a frequency related to said predetermined frequency and having a polarity which indicates the direction of the deviation of the zero axis of the scanning path of said beam from said predetermined median line, said second signal component also having an amplitude which is a function of the distance that said beam deviates from said median line, means coupled to said photo-electric device for selectively transmitting substantially only said first signal component continuously to a ultilization circuit, means supplied continuously with said second signal component which passes substantially only signals having said predetermined frequency, and means responsive substantially only to the polarity and amplitude of said passed signals for deflecting said electron beam in such a direction and by such an amount as substantially to maintain the excursions of said light beam centered on said parallel recorded lines.

References Cited in the file of this patent

UNITED STATES PATENTS

| | | |
|---|---|---|
| 2,575,445 | Germer | Nov. 20, 1951 |
| 2,604,534 | Graham | July 22, 1952 |
| 2,671,129 | Moore | Mar. 2, 1954 |
| 2,691,743 | Urtel | Oct. 12, 1954 |
| 2,773,118 | Moore | Dec. 4, 1956 |

FOREIGN PATENTS

| | | |
|---|---|---|
| 639,247 | Great Britain | June 21, 1950 |
| 673,202 | Great Britain | June 4, 1952 |

UNITED STATES PATENT OFFICE

CERTIFICATE OF CORRECTION

Patent No. 2,851,521 September 9, 1958

Richard G. Clapp

It is hereby certified that error appears in the printed specification of the above numbered patent requiring correction and that the said Letters Patent should read as corrected below.

Column 6, line 71, after "substantially" insert -- only --; column 7, line 20, strike out "to"; column 8, line 4, after "lines" insert a comma.

Signed and sealed this 2nd day of December 1958.

(SEAL)
Attest:

KARL H. AXLINE
Attesting Officer

ROBERT C. WATSON
Commissioner of Patents